(No Model.)
F. W. OSTROM.
BUTTON HOLE CUTTING ATTACHMENT FOR BUTTON HOLE SEWING MACHINES.
No. 303,454. Patented Aug. 12, 1884.
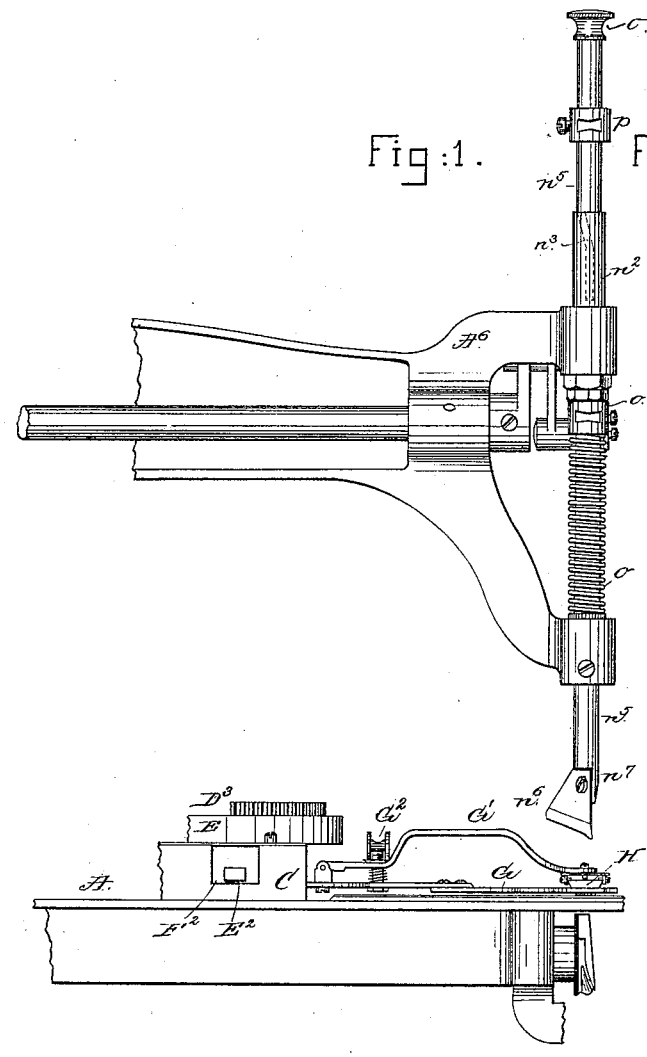
Fig: 1.
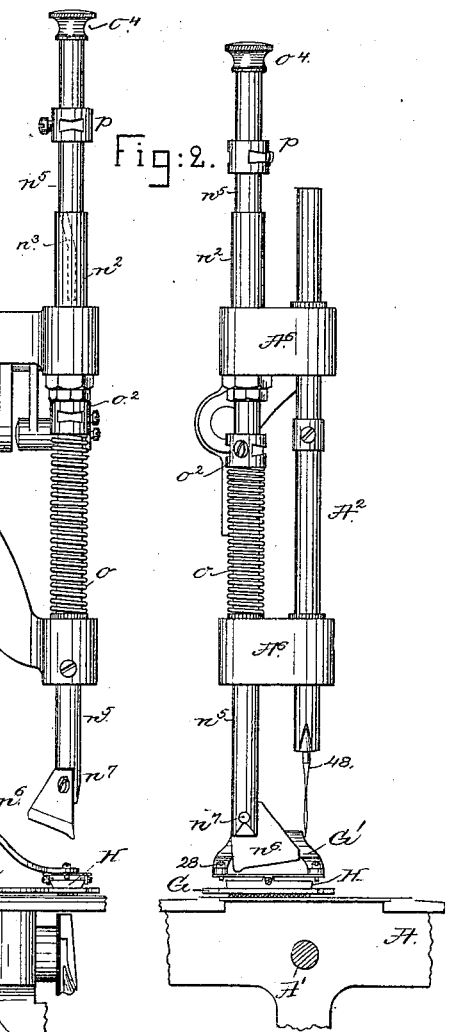
Fig: 2.
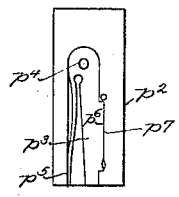
Fig: 3.
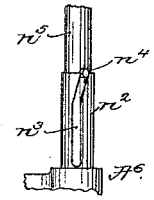
Fig: 4.
Witnesses.
B. J. Noyes.
John F. C. Preinkert
Inventor.
Freeland W. Ostrom.
by Crosby & Gregory
attys.

UNITED STATES PATENT OFFICE.

FREELAND W. OSTROM, OF TROY, NEW YORK, ASSIGNOR TO THE WHEELER & WILSON MANUFACTURING COMPANY, OF BRIDGEPORT, CONNECTICUT.

BUTTON-HOLE-CUTTING ATTACHMENT FOR BUTTON-HOLE SEWING-MACHINES.

SPECIFICATION forming part of Letters Patent No. 303,454, dated August 12, 1884.

Application filed July 30, 1883. Renewed June 11, 1884. (No model.)

*To all whom it may concern:*

Be it known that I, FREELAND W. OSTROM, of Troy, county of Rensselaer, State of New York, have invented an Improvement in Button-Hole-Cutting Attachments for Button-Hole Sewing-Machines, of which the following description, in connection with the accompanying drawings, is a specification, like letters on the drawings representing like parts.

My invention has for its object the construction of a simple mechanism by which the cloth or material in which a button-hole is to be cut and worked may be quickly and accurately cut after the cloth or material had been clamped under the foot of the cloth carrier or clamp. In this my invention I have removed from the sewing-machine the usual presser-bar, and in place of the same have substituted a cutter-bar provided at its lower end with a button-hole cutter, and to secure the correct alignment of the cutter with the center of the foot of the clamp I have provided the said bar with a guide. The bar is normally kept in elevated position by a spring, and the pin and guide referred to, when the bar is elevated, cause it to be so turned about its center as to throw the button-hole cutter away from under the needle-bar. The throat-plate is provided with a pivoted arm, which serves as a co-operating member for the cutter carried by the bar.

Figure 1, in side elevation, represents a sufficient portion of a button-hole sewing-machine to illustrate my invention; Fig. 2, a right-hand end view of Fig. 1, but with the cutter-bar forced partially down. Fig. 3 shows the pivoted arm of the throat-plate, and Fig. 4 a detail of the pin and guide for partially rotating the cutter-bar.

Referring to the drawings, G G' H represent the clamp which holds and moves the material in which the button-hole slit is to be cut, and worked by a sewing-machine such as represented in my application No. 102,321, filed July 30, 1883, to which reference may be had, the parts herein the same as in the said application being designated by like letters. The overhanging arm and head $A^6$, as herein shown, is that common to the Wheeler & Wilson machine. Having removed the usual presser-bar, I attach to the head a sleeve, $n^2$, having an irregular slot, $n^3$, which is adapted to receive a pin, $n^4$, in the cutter-bar $n^5$, which is inserted in the head $A^6$, instead of the usual presser-bar. This bar is passed down through a spiral spring, $o$, supported at its lower end by the head, and an adjustable collar, $o^2$, secured to the bar $n^5$, rests upon the upper end of the spring, so that the latter normally acts to keep the bar $n^5$ elevated, as in Fig. 1, with the pin $n^4$ in the upper end of the slot $n^3$, as in Fig. 4, which so rotates the bar $n^5$ that the blade or cutter $n^6$, attached thereto by the screw $n^7$, is turned to one side away from the open top of the foot H of the cloth-clamp. The cloth having been properly clamped, and the clamp being in position, as described in my said application, to commence the stitching of a button-hole, the operator will strike, by hand or otherwise, the head $o^4$ of the bar $n^5$, and will depress the same, causing the cutter or blade to pass down through the top of the foot H of the cloth-clamp, and through the cloth clamped between its jaws, cutting a hole entirely through the cloth or material centrally with relation to the foot H, and in the line of the feed of the cloth from end to end of the button-hole under the needle 48. In the descent of the bar $n^5$, as soon as the pin $n^4$ reaches the vertical part of the slot $n^3$, the cutter or blade $n^6$ is brought into central position (see Fig. 2) with relation to the foot H, and thereafter during the further descent of the bar $n^5$ it does not rotate.

To constitute a lower member or a shear-like device to co-operate with the blade $n^6$, the throat-plate $p^2$ is provided with an arm, $p^3$, pivoted at $p^4$, and acted upon by a spring, $p^5$, there being between the edge $p^6$ of said arm and the edge $p^7$ of the said throat a slit, down into which the cutter or blade descends after passing through the material held by the clamp, the descent of the cutter or blade being regulated by the adjustable collar $p$ on the bar $n^5$, which comes against the top of the sleeve $n^2$. As soon as the slit has been cut in the cloth, the spring $o$ quickly lifts the bar into the position, Fig. 1.

I claim—

1. In a sewing-machine, the head $A^6$, a clamp to hold and feed the material, and a cutter-bar provided with a blade, combined with a guide and a suitable pin co-operating therewith, whereby the bar will be partially rotated about its axis during its descent to bring the edge of the blade in the proper central position with relation to and to cut the material held by the clamp, the said bar during its ascent being turned in the opposite direction to remove the blade from the path of the needle and needle-bar, as and for the purposes set forth.

2. In a button-hole sewing-machine, a clamp to hold and feed the material, a reciprocating and partially rotating cutter-carrying bar provided with a blade to cut the material while held by the clamp immediately below the needle, combined with a spring to elevate the said bar, and with means, substantially as described, to regulate the extent of its downward motion, as and for the purposes set forth.

In testimony whereof I have signed my name to this specification in the presence of two subscribing witnesses.

FREELAND W. OSTROM.

Witnesses:
ISAAC HOLDEN,
LOUIS H. BAKER.